Inventors.
Leo E. Main.
Jack R. Piper.
Lawrence J. Smith.
By Mann, Brown and McWilliams,
Attys.

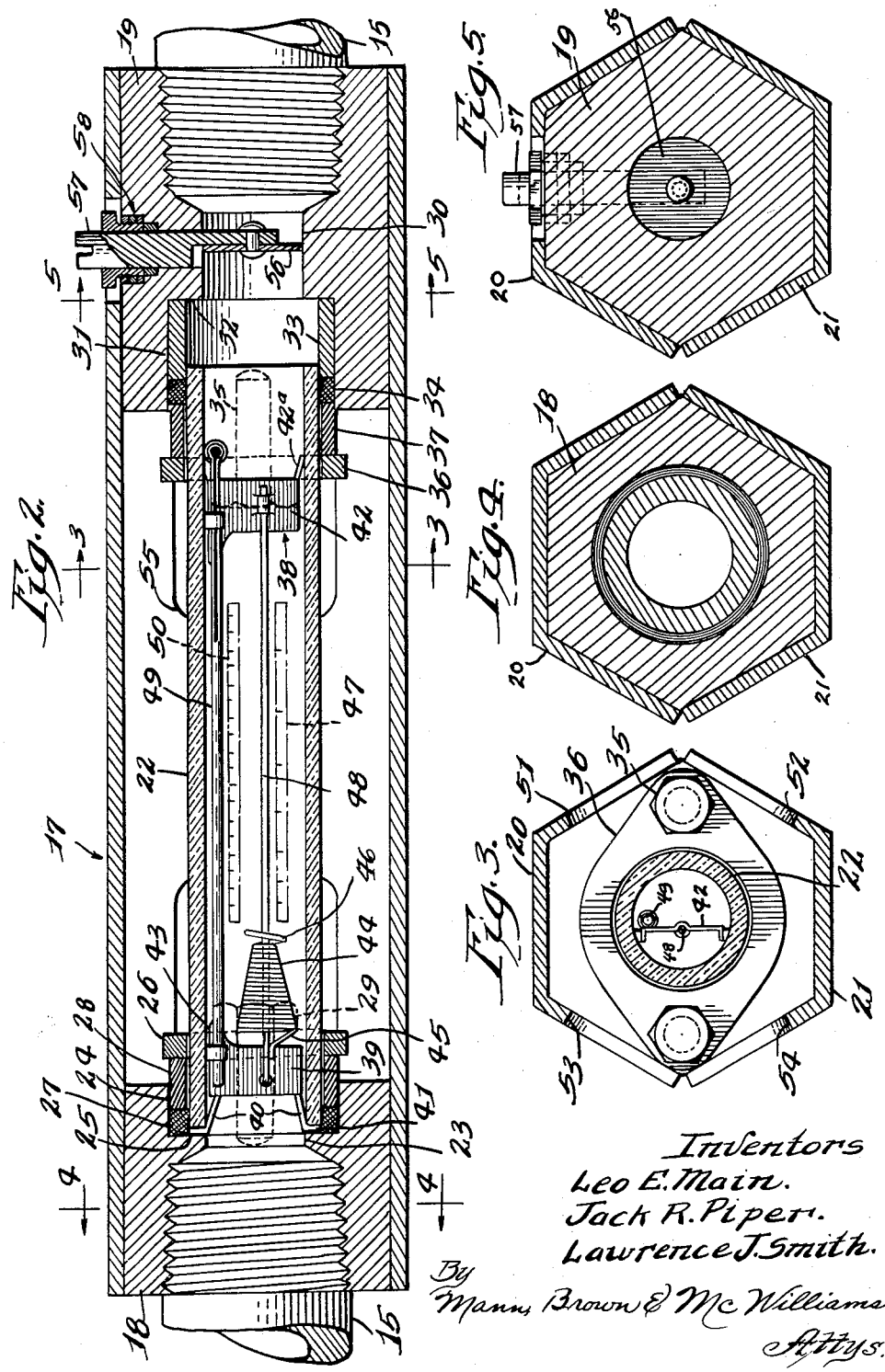

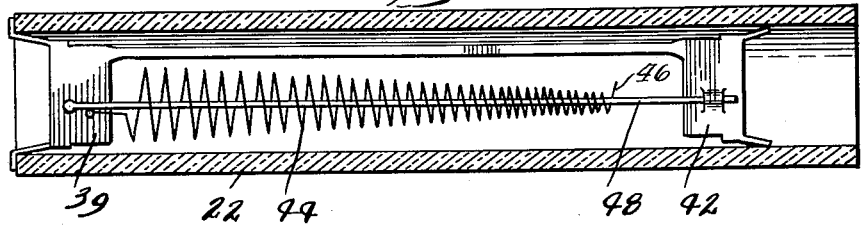
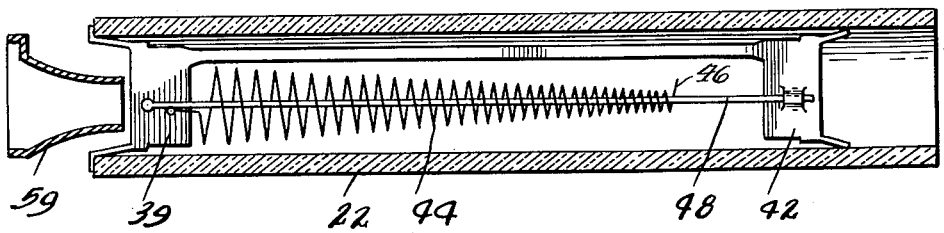
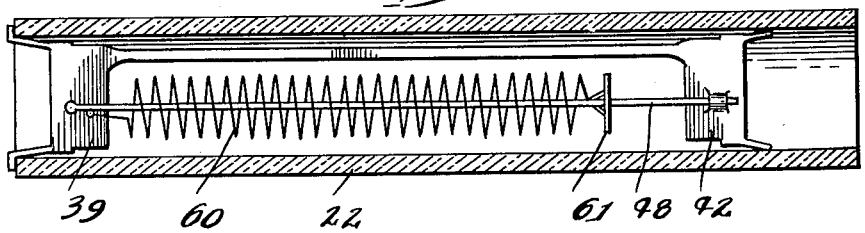
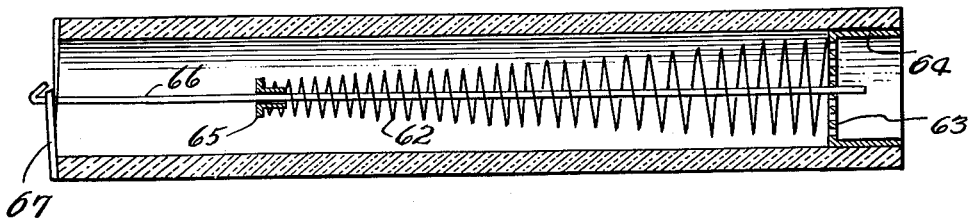
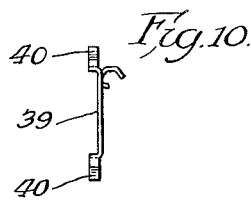
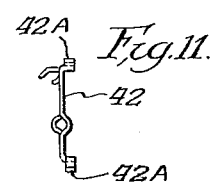

United States Patent Office 2,979,947
Patented Apr. 18, 1961

2,979,947

FLOW METER WITH CYLINDRICAL SPRING RESTRICTION

Leo E. Main, Chicago, Jack R. Piper, Mount Prospect, and Lawrence J. Smith, Oak Park, Ill., assignors to Bell & Gossett Company, Oak Park, Ill., a corporation of Illinois Filed Jan. 14, 1958, Ser. No. 708,933

10 Claims. (Cl. 73—207)

This application is filed as a continuation-in-part of our copending application, Serial No. 517,852, filed June 24, 1955, now Patent No. 2,850,897, the disclosure of which, to the extent it is not inconsistent herewith, is specifically incorporated by reference.

Our invention relates to a fluid flow meter capable of easy insertion in a pipe or conduit and arranged to visually indicate the presence and rate of flow therethrough as well as the temperature of the fluid, whether liquid or gas.

Meters of this type are particularly useful in parallel branch circuits which receive their fluid from a common supply pipe where it is desired to establish different flow rates in the several circuits. They have special application in the multi-circuit type of hot water heating system where the heat load in one circuit may differ from that in another circuit. Assuming a two-circuit system by way of example, it is possible to establish visually observable, different flow rates in the two circuits based upon the calculated heat requirements thereof. This procedure enables the meters to be installed at any time of the year rather than only during the heating season.

So far as known, such meters generally include a movable member which is biased towards a zero position by a spring and whose position at any instant is determined by the fluid flow rate through the meter, the member being exposed to the fluid flow.

It is therefore one object of our invention to provide a flow meter in which the indicating member that is responsive to and indicates flow rate takes the form of an extendible, conical, helical spring whose deflection curve is parabolic or linear depending upon other factors in the meter, or of a simple helical spring characterized by a linear deflection, or of a conical, helical spring which shortens in length for different flow rates and exhibits a linear deflection curve.

A further object is to provide a flow meter which incorporates a control valve whose adjustment determines the flow rate visually indicated by other parts of the meter to thereby eliminate the necessity for a control valve elsewhere in the associated pipe.

A further object is the provision of a flow meter having any of the responsive members above which is housed for movement within a transparent tube carried by a substantial structure having sufficient rigidity to enable the application of a wrench thereto for mounting the meter in a pipe line without damage to or requiring the removal of the transparent tube.

These and further objects of the invention will be set forth in the following specification, reference being had to the accompanying drawings, and the novel means by which the objects are effectuated will be definitely pointed out in the claims.

In the drawings:

Fig. 2 is an enlarged, sectional elevation of the meter taken along the longitudinal axis thereof.

Figure 1:
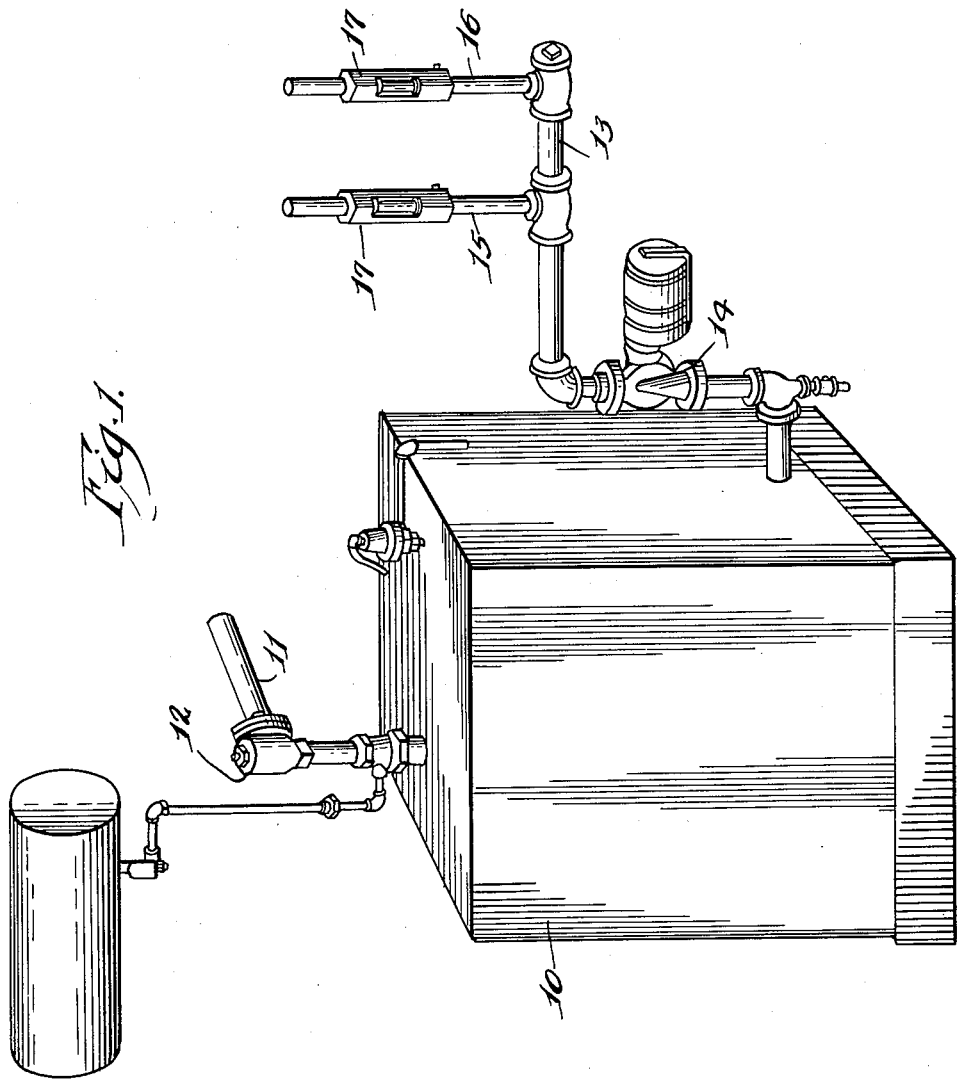
Fig. 1 is a fragmentary elevation showing the application of the flow meter to parallel circuits in a hot water heating system.

Figs. 3, 4 and 5 are sections along the lines 3—3, 4—4, and 5—5, respectively, in Fig. 2.

Fig. 6 is a fragmentary section as in Fig. 2 diagrammatically showing the indicating spring elongated in response to some flow rate.

Figs. 7, 8 and 9 are fragmentary sections similar to Fig. 6, but showing modified arrangements.

Figs. 10 and 11 are views of the upstream and downstream ends, respectively, of the skeleton carrier of the invention.

Referring to Fig. 1, the numeral 10 designates a typical hot water boiler forming part of a hot water heating system whose heating units (not shown) are supplied through a pipe 11 that may include the usual flow control valve 12. Water from the heating units returns to the boiler through a pipe 13 which preferably includes a motor operated pump 14 for establishing forced circulation through the system whenever demanded by a room thermostat (not shown).

The system shown is of the multi-circuit type, two such circuits being indicated which are serviced by the parallel pipes 15 and 16, respectively, that are bridged between the supply and return pipes 11 and 13, respectively. If it be assumed that the heat requirements in the two circuits differ, it is important for efficient operation that the liquid flow rates through the pipes 15 and 16 be adjusted accordingly and, for this purpose, a flow meter 17 is incorporated in each of the latter pipes and illustrated more particularly in Figs. 2–6, inclusive.

Referring to Fig. 2, the numerals 18 and 19 designate coupler blocks which are positioned at opposite ends, respectively, of the meter and axially threaded to receive ends of sections comprising the pipes 15 or 16 of Fig. 1. The detailed illustration of Fig. 2 is shown in relation to the pipes 15. These blocks are preferably hexagonal in transverse section and are connected by facing, semi-hexagonal, metallic shells 20 and 21 which are firmly attached to the blocks 18 and 19 in any approved manner. The portions of the shells which overlie the blocks provide wrench-receiving surfaces and the structure has sufficient rigidity to enable the meter to be installed in a pipeline without removing or endangering the transparent tube presently described.

This tube, indicated by the numeral 22, may be composed of glass or generally any material characterized by adequate transparency and is mounted coaxial with, and its opposite ends are supported in, the coupler blocks 18 and 19, respectively. Specifically, the block 18, which is the inlet end of the meter 17, includes a passage 23 coaxial with and providing communication between one section of the pipe 15 and the inlet end of the tube 22, and the delivery end of the passage 23 terminates in a counterbored portion whose annular wall 24 surrounds the adjacent end of the tube 22 in spaced relation thereto and whose annular shoulder 25 faces the tube end. An elongated flange 26 loosely encircles the tube 22 and successively interposed between the shoulder 25 and flange 26 and also encircling the tube 22 is a packing ring 27 and a sleeve 28 which has a loose fit on the tube. Cap screws 29 extend through the ends of the flange 26 and are threaded in the coupler block 18 to thereby provide a means for moving the flange 26 towards the left, as viewed in Fig. 1, and effecting a leak-tight contact of the packing ring 27 with the tube 22, wall 24 and shoulder 25, and also providing a cushioned support for the latter tube.

Considering the opposite end of the meter 17, the coupler block 19 includes a passage 30 coaxial with and providing communication between the other section of the pipe 15 and the delivery end of the tube 22. The inlet end of the passage 30 merges with a counterbored portion in the block 19 including an annular wall 31 having a larger diameter than the outside diameter of the tube 22 and an annular shoulder 32. The axial length of the wall 31 is longer than that of the wall 24 for a purpose presently explained.

A spacer sleeve 33 fits easily within the annular wall 31 with one end abutting the shoulder 32 and its inner diameter is such that it has loose guiding relation to the adjacent end of the tube 22 which extends slightly within the sleeve 33 as shown when the meter is conditioned for service. Abutting the opposite end of the spacer sleeve 33 is a packing ring 34 which is expanded into leak-tight connection with the tube 22, wall 31 and sleeve 33 by a pressure set up by cap screws 35 threaded in the block 19 and acting successively through an elongated flange 36 and sleeve 37, the latter flange and sleeve loosely encircling the tube 22. The shape of the flange 36 is shown in Fig. 3 and the flange 26 is identical. The packing ring 34 also provides a cushion support for the adjacent end of the tube 22.

To visually indicate the flow rate as well as the temperature of liquid flowing through the tube 22, the following instrumentalities are provided. A skeleton carrier 38 of light weight is positioned within the tube 22 and is conditioned to neither exercise any substantial restriction on nor to create any turbulence in the liquid flow. Specifically, the carrier 38 includes a thin, flat plate 39 (see the end view thereof in Fig. 10) diametrically positioned within the tube 22 adjacent the inlet end thereof and from which extend oppositely directed arms 40—40, each of which terminates in an ear 41 interposed between the shoulder 25 and the end of the tube 22 to thereby anchor the carrier 38 against endwise displacement in the direction of liquid flow. A like plate 42 (see the end view thereof in Fig. 11) is located at the opposite end of the carrier 38 short of the delivery end of the tube 22 and in coplanar relation to the plate 39, the plates 39 and 42 being connected by a neck 43 (see Fig. 3) which joins the upper portions of these plates so that there is clear space below the neck 43 and between the plates as viewed in Fig. 2. The plate 42 is supported in the tube 22 by legs 42ᵃ.

The plates 39 and 42 constitute spaced apart centering structures, the legs of which present surfaces for engagement with the inner periphery of the conduit for locating these structures against transverse movement in the conduit. These centering structures support the guide wire at its opposite ends to locate the guide wire substantially medially in the conduit. While in the preferred form disclosed herein the guide wire is a relatively weak member and the neck 43 is relied upon for lending the necessary rigidity to the skeleton carrier, the guide element may be made of a strength sufficient to eliminate the necessity of the neck.

A conical, helical spring 44 formed of wire is positioned within and so that its axis extends longitudinally of the tube 22. The major end of the spring 44 lies adjacent the carrier plate 39 and the wire composing this end of the spring is extended at 45 for anchorage attachment to this plate. The opposite or minor end of the spring 44 is free to move and the smallest convolution is transversely extended to a convenient diameter to provide an indicator or annular finger 46. When the spring 44 is elongated by the liquid flow, the indicator 46 moves relative to a transparent decal scale 47 which is affixed to the outer surface of the tube 22 and appropriately calibrated to indicate flow rate for any position of the indicator.

For a sample unit, the spring 44 may be composed of wire having a diameter of .016″ and its non-extended length, as shown in Fig. 2, is ¾″, the diameter of the large end of the spring being 15/32″ while that of the small end is 1/16″. The spring 44 is therefore light in weight and accordingly very responsive to liquid impact. In Fig. 2, the spring is shown in a biased, non-elongated position in which the convolutions are in touching relation or substantially so, corresponding to either an absence of flow through the meter, or a flow so minute as not to be measurable by an instrument of this type. When the spring is elongated, the smallest convolution thereof is guided by a wire 48 which extends generally coaxially through the spring and is bridged between the carrier plates 39 and 42, the diameter of the guide wire 48 being such that the smallest convolution of the spring 44 will move freely therealong.

Also bridged between the carrier plates 39 and 42 and at the same elevation as and close to the neck 43 is a thermometer 49 for visually indicating liquid temperature with reference to a thermometric scale 50 arranged as a transparent decal affixed to the outer surface of the tube 22. Since the scales 47 and 50 would be affixed to the right half of the tube 22, as viewed in Fig. 3 and so actually would not appear in the Fig. 2 section, they are for convenience shown by dot and dash lines in the latter figure to delineate their relation to the indicator 46 and thermometer 49. For ready viewing of the two latter elements, the shells 20 and 21 on their right sides, as viewed in Fig. 3, are cut away between the blocks 18 and 19 to provide complementarily related openings 51 and 52, respectively, which together form one elongated opening permitting observation of the tube 22 between the flanges 26 and 36. The opposite sides of the shells 20 and 21 are also cut away to provide like openings 53 and 54, respectively, which are interrupted by a central web 55 whose transverse edges are spaced conveniently from the flanges 26 and 36, respectively.

Any selected flow rate through the meter 17 is established by a control valve 56 of the butterfly type which is positioned in the delivery passage 30 and affixed to the lower end of a stem 57 which is rockably mounted in the coupler block 19 and extends externally thereof for working connection with a suitable tool. Leakage along the stem 57 is prevented by a packing-stuffing box structure, generally indicated by the numeral 58.

When flow is established through the meter 17 by opening the valve 56 fully or partially, the spring 44 will elongate a distance proportional to the flow rate due to the liquid impact and by observing the position of the indicator 46 relative to a marking on the flow rate scale 47, this rate can be determined. In this connection, it will be noted that the rate scale 47 is calibrated on any desired volumetric rate basis, such as gallons per minute, and since the deflections of the spring 44 for varying flow rates follow a parabolic pattern, the markings on the scale 47 are accordingly spaced as shown. The spring 44 is highly sensitive to changes in flow rate, any particular rate being established by appropriately positioning the valve 56.

The meter 17 is characterized by ruggedness and by simplicity in structure that is reflected in manufacturing economies, particularly with reference to assembly. For example, the transparent tube 22 and the parts housed therein may be subassembled and this collection installed as a unit in the coupler blocks 18 and 19. To remove this subassembly, it is merely necessary to withdraw the cap screws 29 and 35, slide the tube 22 towards the right in Fig. 2 and the sleeves 28, 33 and 37, the flanges 26 and 36, and the packing ring 34 towards the center of the tube 22, whereupon the left end of the tube 22 may be swung through the opening formed by the cut-outs 51 and 52.

In Figs. 7 to 9, inclusive, are illustrated varying metering arrangements in which some of the elements are identical with those heretofore described and are designated by the same numerals.

Referring to Fig. 7, the metering spring 44 is also used, but an additional element is introduced which renders the spring more sensitive to so-called low flows, i.e., flows up to about 3½ gallons per minute, all rate figures assuming that the liquid is water or a liquid having about the same viscosity. This added element takes the form of an orifice 59 which, referring to Fig. 2, would be positioned in the passage 23 with its delivery end coaxial with the spring 44 and having a diameter such that liquid issuing from the orifice is directed to the interior of the spring.

The orifice 59 is shaped so that the velocity of the liquid directed to the interior of the spring 44 is higher than if the orifice were not present. Accordingly, the kinetic energy of each unit volume of the flowing liquid is higher and hence its impact effect. If the tube 22 be considered as filled with a liquid with the valve closed and a constant pressure head acting at the inlet of the orifice 59, the spring 44 is then in the retracted or closed position as shown in Fig. 2. In this condition, the spring 44 has the form of a conical, hollow shell whose only opening at the small end is that provided by the smallest convolution of the spring, which is negligible. This spring shell is filled with the liquid in a static condition and when the valve 56 is opened to the desired extent, the liquid issuing from the orifice exerts a directed pressure on the incompressible liquid mass within the spring shell so that the spring begins to elongate. When the convolutions have opened sufficiently, the original liquid mass within the spring shell is gradually replaced by the continuing flow which also acts against the surfaces on the uncovered convolutions. Deflections of the spring 44 in this modification are linear, and the markings on the flow rate scale 47 are arranged accordingly. The above spring action also occurs in the Fig. 2 modification, but the annular liquid mass outwardly of the spring plays little or no part in the spring elongation, but this fact is unimportant because of the higher flow rate.

In Fig. 8, the helical metering spring 60 is of the cylindrical type and carries an indicating disk 61 on its free end which is subject to flow impact. The deflection curve of this spring is parabolic. The indicator disk 61 may also be used with the spring 44 in Fig. 2.

It will be apparent that the spring 60 of the Fig. 8 arrangement may be of the tension type as in the case of spring 44 of Figs. 6 and 7, in which case liquid flow is from left to right in Fig. 8 and the spring is shown in an extended flow-rate indicating position, or the spring 60 may be of the compression type, in which case liquid flow must be from right to left in Fig. 8, and it will be understood that in the case of a compression spring the illustrated position thereof in Fig. 8 corresponds to a zero flow rate.

Whether considering the spring arrangement of Fig. 8 as a tension or compression type, liquid flow through the tube 22 exerts pressure on the upstream face of the disk 61 for loading the spring and thereby changing the length thereof to produce the desired indication of the flow rate.

In Fig. 9, the conical, helical spring 62 is of the compression type and is shown in fully elongated position corresponding to an absence of flow through the tube 22. The large end of the spring 62 is backed by a spider 63 which is retained in position by a sleeve 64 suitably held in the tube, while the small and free end of the spring carries an indicating disk 65 exposed for liquid impact. This disk is guided for movement on a wire 66 which extends therethrough, one end of the wire 66 being attached to a retainer 67 at the inlet end of the tube 22 and the opposite end being supported by the spider 63.

Liquid flowing through the tube 22 exerts pressure on the disk 65 and effects a compression of the spring 62, components of the pressure also acting against the flaring side of the spring. The extent of the compression depends upon the flow rate up to a maximum in which the spring assumes a substantially flattened condition due to the nesting of successive convolutions. The deflection curve of this spring is linear.

While the flow meter is specifically shown in the drawings as applied to a liquid system and so described, it is also capable of use in any gas system.

We claim:

1. In a fluid flow meter including a conduit arranged for interposition in a pipe line and having an inlet end, an outlet end, and a transparent section therebetween, a unit assembly for indicating the flow rate of fluid in said conduit and comprising a skeleton carrier positioned in the conduit and held against movement therealong and including spaced apart centering structures each having surfaces extending to and engageable with the inner periphery of said conduit at a plurality of points spaced thereabout for locating said structures against transverse movement in said conduit, an elongated guide element having its opposite ends supported in said structures to locate said element substantially medially in said conduit, a cylindrical helical spring in telescoping relation with said guide element and extending endwise thereof for exposure to fluid flow in said conduit, one end of the spring being anchored to one of said structures and the other end being confined against transverse movement in the conduit by engagement with said guide element, said engagement accommodating free-sliding movement between said other end and said guide element in a direction endwise of the conduit such that said other end is an indicator relative to visible indicia associated with the transparent section.

2. The arrangement of claim 1 wherein said guide element is a wire and said spring is telescoped over the wire.

3. The arrangement of claim 1 wherein said centering structures are interconnected by a neck portion extending therebetween to maintain the spacing thereof, said guide element is a wire, and said spring is telescoped over the wire.

4. The arrangement of claim 1 wherein said skeleton carrier has means thereon facing downstream for abutting engagement with an upstream-facing surface of said conduit to maintain said carrier against down-stream movement through said conduit.

5. The arrangement of claim 4 wherein said downstream-facing means is carried by the upstream one of said structures.

6. A fluid flow meter comprising an elongated shell member having a passaged block at each end for receiving a pipe section, a transparent tube providing a flow connection between the blocks and having leak-tight connections therewith, a skeleton carrier positioned in the tube and held against movement therealong including a pair of spaced, flat, thin plates located within and adjacent the inlet and outlet of the tube, respectively, and positioned lengthwise thereof, the inlet and outlet plates, respectively, including arms having anchoring engagement with the inlet end of the transparent tube and supporting contact with the inner wall of the transparent tube, a guide wire securably bridged between the plates, and means for indicating the fluid flow rate through the tube including a cylindrical helical spring exposed to the fluid flow and extending longitudinally of the tube around the guide wire, one end of the spring being anchored to the flat plate adjacent the tube inlet and the other end being free to move along the guide wire as an indicator relative to a scale on the transparent tube.

7. A fluid flow meter comprising an elongated housing having a passaged block at each end thereof for receiving pipe sections, a transparent tube providing a flow connection between the blocks and having leak-tight connections therewith, a skeleton carrier positioned in the tube and held against movement therealong including spaced apart centering structures each having surfaces extending to and engageable with the inner periphery of said tube at a plurality of points spaced thereabout for locating said structures against transverse movement in said tube, an elongated guide element having its opposite ends supported in said structures to locate said element substantially medially in said tube, a cylindrical helical spring in telescoping relation with said guide element and extending endwise thereof for exposure to fluid flow in said tube, one end of the spring being anchored to one of said structures and the other end being confined against transverse movement in the tube by engagement with said guide element, said engagement accommodating free-sliding movement between said other end and said guide element in a direction endwise of the tube such that said other end is an indicator relative to visible indicia associated with the transparent section.

8. A fluid flow meter comprising an elongated shell member including a cut-out portion defining an observing window and having a passaged block at each end for receiving a pipe section, a transparent tube bridged between the blocks and viewable through the window, the opposite ends of the tube being received within relatively long and short counterbores in the blocks, respectively, and the tube being normally positioned with one end spaced from the shouldered end of the long counterbore and the other end adjacent the shouldered end of the short counterbore, detachable packing means surrounding each end of the tube within each counterbore, a skeleton carrier positioned in the tube and held against movement therealong including a pair of spaced, flat, thin plates located within and adjacent the inlet and outlet of the tube, respectively, and positioned lengthwise thereof, the inlet and outlet plates, respectively, including arms having anchoring engagement with the inlet end of the transparent tube and supporting contact with the inner wall of the transparent tube, a guide wire securably bridged between the plates, and means for indicating the fluid flow rate through the tube including a cylindrical helical spring exposed to the fluid flow and extending longitudinally of the tube around the guide wire, one end of the spring being anchored to the flat plate adjacent the tube inlet and the other end being free to move along the wire as an indicator relative to a scale on the transparent tube, the relative lengths of the window and tube being such that when the packing means are detached and moved to a position central of the tube, the latter is movable endwise to clear the short counterbore for removal thereof and the enclosed carrier through the window.

9. A fluid flow meter comprising an elongated housing having a cut-out portion defining an observing window and having a passaged block at each end for receiving a pipe section, a transparent tube bridged between the blocks and viewable through the window, the opposite ends of the tube being received within relatively long and short counterbores in the blocks, respectively, and the tube being normally positioned with one end spaced from the shouldered end of the long counterbore and the other end adjacent the shouldered end of the short counterbore, detachable packing means surrounding each end of the tube within each counterbore, a skeleton carrier positioned in the tube and held against movement therealong and including spaced apart centering structures each having surfaces extending to and engageable with the inner periphery of said tube at a plurality of points spaced thereabout for locating said structures against transverse movement in said tube, an elongated guide element having its opposite ends supported in said structures to locate said element substantially medially in said tube, a cylindrical helical spring in telescoping relation with said guide element and extending endwise thereof for exposure to fluid flow in said tube, one end of the spring being anchored to one of said structures and the other end being confined against transverse movement in the tube by engagement with said guide element, said engagement accommodating free-sliding movement between said other end and said guide element in a direction endwise of the tube such that said other end is an indicator relative to visible indicia associated with the transparent section.

10. A skeleton carrier for mounting in a fluid flow conduit to anchor and guide an extensible coil spring within said conduit, said carrier comprising a one piece skeleton frame having lengthwise spaced centering structures interconnected by a lengthwise extending integral neck portion for supporting and maintaining the centering structures in predetermined spaced relation along the conduit, each centering structure comprising a plate oriented in a plane lengthwise of said carrier to present a minimum flow restriction in said tube and a plurality of integral legs projecting from said plate in directions transverse of said carrier for engagement interiorly with said conduit for positioning the structures against transverse movement, one of said plates having formations for anchoring one end of said spring against downstream movement and one of said plates having formations at the extremities of the legs thereof for anchoring engagement with the conduit to prevent downstream movement of the carrier, with said neck portion extending between corresponding transverse extremities of said plates, and an elongated wire-like guide element for receiving the spring in telescoping relation and having its opposite ends connected to said plates substantially medially thereof to extended in parallel spaced relation to said neck portion.

References Cited in the file of this patent
UNITED STATES PATENTS

| | | |
|---|---|---|
| 2,311,375 | Farwick | Feb. 16, 1943 |
| 2,313,889 | Porter | Mar. 16, 1943 |
| 2,850,897 | Main et al. | Sept. 9, 1958 |